United States Patent [19]

Hong et al.

[11] Patent Number: 4,600,659

[45] Date of Patent: Jul. 15, 1986

[54] EMISSIVE COATING ON ALLOY X-RAY TUBE TARGET

[75] Inventors: Jauwhei Hong, New Berlin; Richard A. Jens, Milwaukee; Steve S. Shen, New Berlin; Earle L. Manson, Jr., Brookfield, all of Wis.

[73] Assignee: General Electric Company, Milwaukee, Wis.

[21] Appl. No.: 643,981

[22] Filed: Aug. 24, 1984

[51] Int. Cl.[4] ........................ B32B 9/00; B32B 15/04; B05D 5/06; B05D 5/12

[52] U.S. Cl. .............................. 428/471; 204/192 SP; 427/34; 427/42; 427/65; 428/472

[58] Field of Search ............................ 427/34, 42, 65; 428/471, 472; 204/192 SP

[56] References Cited

U.S. PATENT DOCUMENTS 4,132,916 1/1979 Hueschen et al. ................ 427/34 X

*Primary Examiner*—James R. Hoffman
*Attorney, Agent, or Firm*—Douglas E. Stoner; Alexander M. Gerasimow

[57] ABSTRACT

An x-ray tube target composed of a molybdenum alloy material such as TZM is coated with a mixture containing from 40 percent to 70 percent of $TiO_2$ with the remaining material being a stabilized oxide. The coating is then fused to a smooth, glossy condition to provide an enhanced thermal-emittance surface that adheres well to the target substrate.

11 Claims, 10 Drawing Figures

60% $TiO_2$ / 40%(8% $CaO \cdot ZrO_2$)

20% $TiO_2$ / 80%(8% $CaO \cdot ZrO_2$)

50% $TiO_2$ / 50%(8% $CaO \cdot ZrO_2$)

90% $TiO_2$/10%(8% $CaO \cdot ZrO_2$)

80% $TiO_2$/ 20%(8% $CaO \cdot ZrO_2$)

Mo TARGET COATED WITH
20% $TiO_2$/ 80%(8% $CaO \cdot ZrO_2$)

TZM TARGET COATED WITH
20% $TiO_2$/80%(8% $CaO \cdot ZrO_2$)

TZM TARGET COATED WITH
50% $TiO_2$/ 50%(8% $CaO \cdot ZrO_2$)

EMISSIVE COATING ON ALLOY X-RAY TUBE TARGET

BACKGROUND OF THE INVENTION

This invention relates generally to x-ray tube anodes and, more particularly, to applied coatings for enhancing the thermal emittance of x-ray tube anode targets.

Because of the very substantial amount of thermal energy created in the generation of x-rays, efforts are made to dissipate the heat from the x-ray tube target as fast as possible. A common approach has been to apply a coating of a selected material on the rear surface of the target to thereby enhance the emissivity of that surface to quickly dissipate the heat from the body of the target. This is shown in U.S. Pat. No. 4,132,916, wherein the coating applied is comprised of up to 20 percent by weight of a high thermal-emittance material $TiO_2$ with the remainder of the composition being made up of an oxide for raising the melting point to an acceptable level and a small amount of a stabilizing material for stability the oxide over the operating temperature range. The primary reason for maintaining the percentage of $TiO_2$ to a level at or below 20 percent by weight was that higher percentages of that material resulted in a liquid runoff from the surface of a molybdenum target when the coating was heated during the fusing process.

The above-mentioned coating has been successfully used with molybdenum targets. However, it has been found that when such a coating is applied to a target composed of a molybdenum alloy, such as the commercially available TZM or MT104, there are problems with both adhesion and surface fusing. The coating will not adhere to the alloy material as well as it does to the molybdenum material. Similarly, the inadequate surface fusing results in a very rough and particulate dominant surface. Such a surface is inadequate for purposes of high-voltage stability because of particulate spallation that would occur.

It is therefore an object of the present invention to provide an improved high thermal-emittance coating for x-ray tube targets.

Another object of the present invention is the provision for a thermal-emittance coating which adheres well to an x-ray target composed of a molybdenum alloy material.

Yet another object of the present invention is the provision in a molybdenum alloy target for a thermal-emittance coating having a surface that is fused to a smooth and glossy condition.

Still another object of the present invention is the provision for a molybdenum alloy x-ray target with an emittance coating which is economical to manufacture and effective in use.

These objects and other features and advantages become more readily apparent upon reference to the following description when taken in conjunction with the appended drawings.

SUMMARY OF THE INVENTION

Briefly, in accordance with one aspect of the invention, the coating that is applied to the surface of an x-ray target is comprised of $TiO_2$ in the amount of 40 percent to 70 percent by weight and a stabilized oxide in the amount of 30 to 60 percent. In one embodiment the stabilized oxide material is comprised of 92 percent by weight of $ZrO_2$ and 8 percent by weight of CaO.

In accordance with another aspect of the invention, the mixture is plasma sprayed to the surface of the target and the coating is then fused in a conventional manner at a high temperature under vacuum. The result is a smooth, glossy surface which adheres well to the target substrate and provides enhanced emissivity characteristics to the target.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
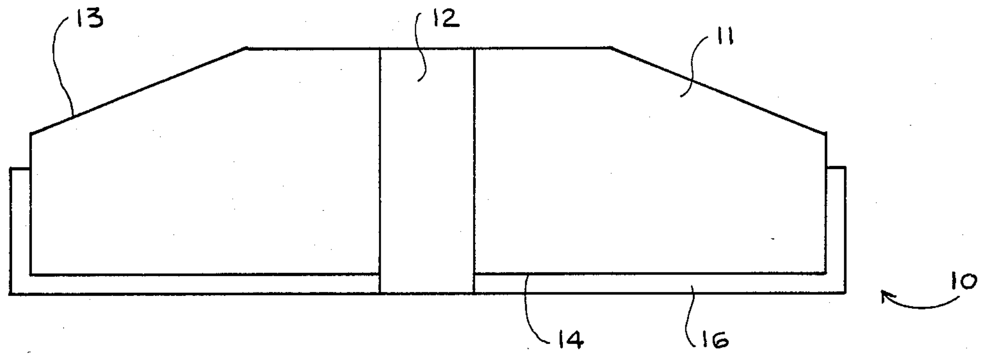
FIG. 1 is a schematic illustration of an anode target with an emittance coating applied in accordance with a preferred embodiment of the invention.

Referring now to FIG. 1, the invention is shown generally at 10 as applied to a rotary x-ray tube anode target 11 having a bore 12 for attachment to an anode stem (not shown). The target 11 has attached to its front side 13 a focal track composed of a high density refractory material for bombardment with electrons to produce x-rays in accordance with conventional practice.

The rear surface 14 of the target body 11 has a coating applied thereto in a manner and composition that is unique to the present invention. The coating 16 acts to enhance the emissivity characteristics on the surface 14 so that the rate of heat transfer from the target 11 will be substantially increased.

The high emissivity coating 16 is composed of a high emissivity material $TiO_2$ and a stabilized oxide whose function is to raise the melting point of the coating to a satisfactory level for operation under normal operating conditions. In accordance with the preferred embodiment, the coating comprises $TiO_2$ in the amount of 40 percent to 70 percent by weight and stabilized $ZrO_2$ in the amount of 30 percent to 60 percent by weight. However, it should be recognized that other oxides may be appropriately used in carrying out the invention. For example, any of the high melting point oxide materials selected from the group consisting of $ZrO_2$, HfO, MgO, $CeO_2$, $La_2O_3$ and SrO would be suitable for mixture with the $TiO_2$ material.

Any of the oxide materials mentioned above, if used by itself with the $TiO_2$, would result in a coating with insufficient phase stability over the operating temperature range (on the order of ambient temperature to 1500° C.). The phase changes that would occur with increased temperatures would cause a blistering or flaking off of the coating from the substrate. Accordingly, it is necessary to stabilize the oxide material by the addition of a stabilizing material selected from the group of CaO and $Y_2O_3$.

When $ZrO_2$ is chosen for the oxide material, and CaO is chosen for the stabilizing material, it has been found that the preferred mixture between oxide and stabilizer is 8 percent by weight of CaO and 92 percent by weight of $ZrO_2$. However, the percentage of CaO can be varied in the range of 4 to 14 percent to provide adequate stabilization for the $ZrO_2$.

Figure 2:
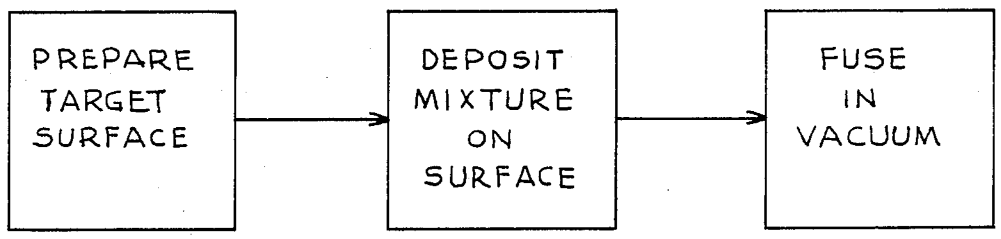
FIG. 2 is a block diagram illustrating the process of coating application in accordance with a preferred embodiment of the invention.

When the mixture of $TiO_2$ and the stabilized oxide has been prepared, the process of applying the coating to the rear surface 14 of the target 11 is substantially the same process as shown and described in U.S. Pat. No. 4,132,916, issued on Jan. 2, 1979 to Hueschen et al and assigned to the assignee of the present invention, which patent is incorporated herein by reference. The process is shown generally at FIG. 2 to include the steps of (1) preparing the target surface; (2) depositing the above-described mixture in the form of a thin coating on the surface of the target; and (3) fusing the coating by heating the combination in a vacuum until the coating has coalesced to a smooth, glossy surface. The particular manner in which each of these steps is accomplished can be varied as suggested by the above-referenced patent.

The molybdenum alloy target is prepared using conventional cleaning procedures. Typically, the surface is first de-greased and is then ultrasonically cleaned, and sand blasted to a roughened surface for the purpose of enhancing its heat-transfer characteristics and its adherence to the applied coating.

The mixture of $TiO_2$ and the stabilized oxide can be applied by any suitable method such as by plasma-arc spraying, vacuum sputtering, or electron-beam deposition. Where the plasma spray process is chosen as a means of deposition, the procedure is identical to that as set forth in the above-referenced patent.

The final step in the process is to heat the coated target in a vacuum to drive out the oxygen, with the oxygen deficiency then causing the increased emissivity characteristics. This step is carried out in a $10^{-5}$ Torr environment at preferred temperatures in the range of 1640°-1650° C. in a manner as shown and described by the above-referenced patent. A satisfactory temperature range which has been found acceptable for the fusing process is 1620°-1700° C. The time period for the fusion process is the time required to obtain a smooth, glossy finish on the coating. A time period of 45 minutes has been found to be satisfactory for that purpose.

EXAMPLES

The following table shows the experimental results that have been obtained with TZM targets coated with various samples using selected compositions over a range of 20 percent to 90 percent by weight of $TiO_2$ with the remaining material comprising stabilized $ZrO_2$ (i.e., 8 percent by weight of CaO and 92 percent by weight of $ZrO_2$).

TABLE

| COMPOSITION % $TiO_2$/% Stabilized $ZrO_2$ | SURFACE FUSION | ADHERENCE | PHASE STRUCTURE |
|---|---|---|---|
| 1. 20-80 | particulate | poor | Cubic $ZrO_2$ |
| 2. 30-70 | particulate | poor | Cubic $ZrO_2$ + Cubic (2 CaO 5 $TiO_2$) |
| 3. 40-60 | glossy | good | Primarily cubic (2 CaO 5 $TiO_2$) |
| 4. 50-50 | glossy | good | Only cubic (2 CaO 5 $TiO_2$) |
| 5. 60-40 | glossy | good | Only cubic (2 CaO 5 $TiO_2$) |
| 6. 70-30 | glossy | good | Only cubic (2 CaO 5 $TiO_2$) |
| 7. 80-20 | crystals forming | good | $TiO_2$ crystals + Cubic (2 CaO 5 $TiO_2$) |
| 8. 90-10 | no coating between crystals | good | $TiO_2$ crystals only on most of surface |

It will be seen from Samples 1 and 2 of the above table, that both the coating with the 20 percent $TiO_2$ and that with the 30 percent $TiO_2$ were found to have unsatisfactory surface fusion and adherence characteristics. The unsatisfactory surface fusion is evidenced by a rough particulate surface which will be clearly seen in the photographs to be discussed hereinafter. The inadequate adherency was demonstrated by a so-called tape test wherein Scotch tape was applied to the coating surface and then removed therefrom. In the case of both Samples 1 and 2, the coating tended to peel off with the tape rather than adhere to the target substrate.

In each of the Samples 3 through 6, the surface fusion was satisfactory, in that it had a smooth, glossy finish. In each of those cases, the adherence was also good as demonstrated by the tape test.

Samples 7 to 8 also showed good adherence characteristics. However, Sample 7, with 80 percent $TiO_2$ showed evidence of $TiO_2$ precipitating out as indicated by the formation of definite crystalline structure. This phenomenon was even more severe in Sample 8 wherein there was essentially no coating left in the area where the crystalline structure was formed. This phenomenon will be better seen with reference to the resultant photographs which will be discussed hereinafter.

Referring now to the last column of the above table, it will be seen that different chemical phases occur across the range of compositions shown. This information was obtained by x-ray diffraction techniques which were applied to each of the samples. In the first sample, the phase structure is entirely cubic $ZrO_2$. The second sample, with 30 percent $TiO_2$, contains cubic $ZrO_2$ structure but also includes the formation of a new phase identified as cubic (2CaO 5$TiO_2$). The third sample coating is primarily made up of the new phase, i.e., cubic (2CaO 5$TiO_2$), but with a trace of cubic $ZrO_2$ structure. Samples 4, 5, and 6 are all of the cubic (2CaO 5$TiO_2$) structure only. Sample 7 is comprised of not only the cubic (2CaO 5$TiO_2$) structure but also of $TiO_2$ crystals. Finally, Sample 8 is comprised primarily of $TiO_2$ crystals.

From the above information, it appears that, in Samples 3 through 6 where the surface fusion and adherence characteristics were found to be satisfactory, the phase structure of the coating was either primarily or entirely that of the new phase (i.e., cubic (2CaO 5$TiO_2$). On the other hand, where the coating was comprised of, entirely or partially, cubic $ZrO_2$ or $TiO_2$ crystalline structure, the coating surface was inadequate, i.e., either a particulate surface or a crystalline surface.

Figure 3:
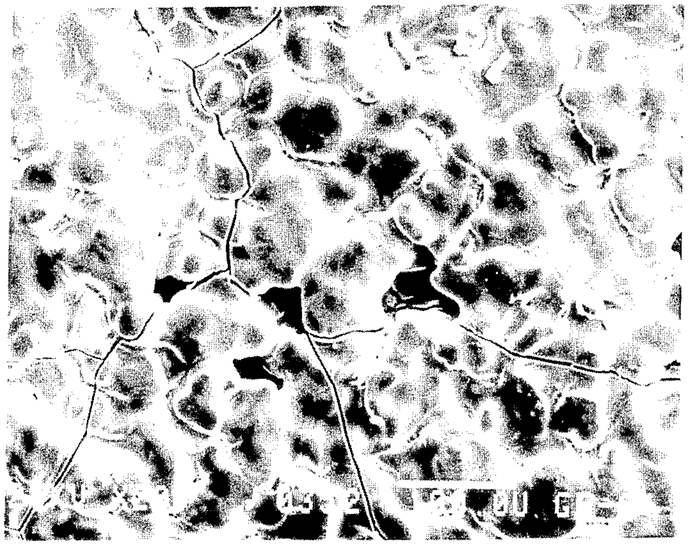
FIGS. 3 through 6C are photographs of electron microscope views showing the structure of various coatings for purposes of illustrating the present invention.

Referring now to FIG. 3, there is shown an electron microscopic view of the structure (×200) of Sample 5 containing 60 percent $TiO_2$ and 40 percent of the stabilized $ZrO_2$. It will be seen that the smooth, rounded surfaces, with very few cracks, are indicative of a proper fusion process, with the coating being of a fairly uniform texture throughout.

Figure 4A:
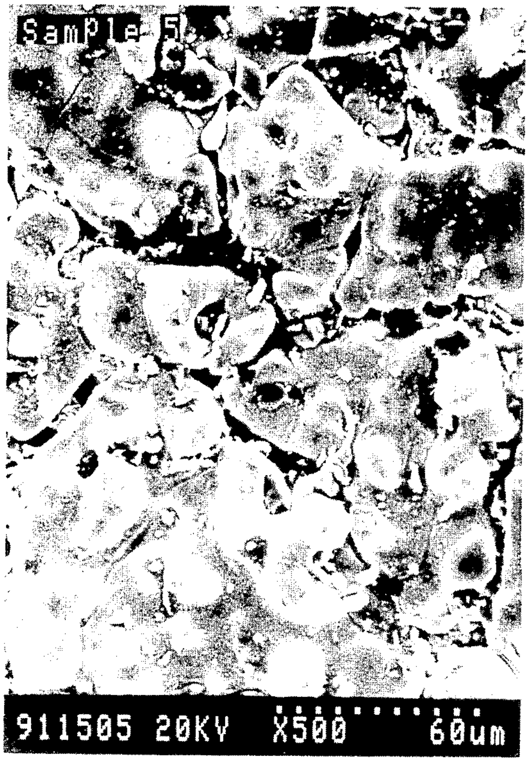
Figure 4B:

An example of an inadequate surface fusion is shown in FIG. 4A wherein the coating shown (×500) is composed of 20 percent $TiO_2$ and 80 percent of the stabilized oxide. Here the edges are rough and irregular, and the texture is very nonuniform indicating that the coating is not properly fused. It will be understood that this coating is more likely to flake off from the surface of the molybdenum alloy target substrate. In contrast, FIG. 4B shows a coating (Sample 4) which is comprised of 50 percent of $TiO_2$ and 50 percent of the stabilized oxide. This view, which is on the same scale (×500) as FIG. 4A, shows a very smooth and uniform surface with very few cracks. The subsurface is well covered and there are few, if any, rough edges that would tend to flake off.

Figure 5B:
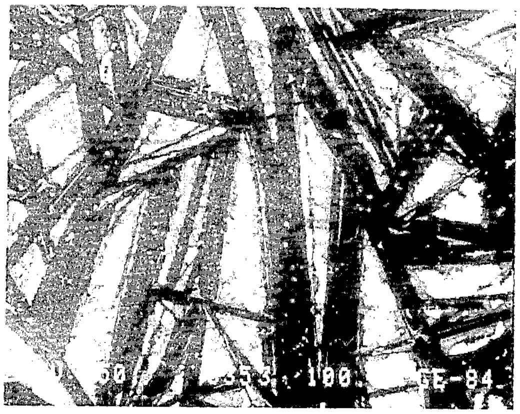
Figure 5A:
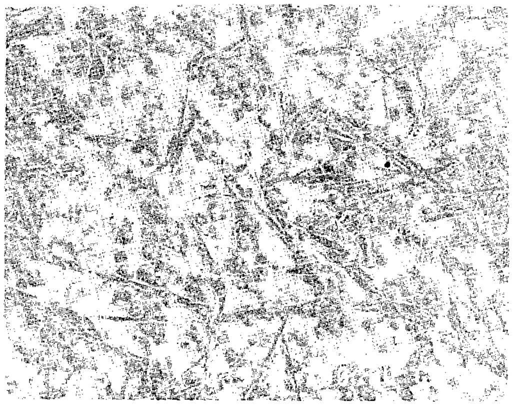

As an indication of what occurs at the high end of the spectrum (i.e., 80 and 90 percent $TiO_2$), FIGS. 5A and 5B show the black crystalline $TiO_2$ structure that is formed on the surface of the coating. In FIG. 5A, there appears to be about equal amounts of the $TiO_2$ crystals and the desirable coating structure shown in white. In FIG. 5B, on the other hand, the crystalline structure is predominant and leaves little room for the desirable coating surface. Such a structure is undesirable, not only because of its high-voltage instability, but also because of its reduced emissivity.

Figure 6A:

In order to best illustrate the adherency characteristic, it would be best to first refer to an optical microscopic photograph of a molybdenum target which has been coated with 20 percent $TiO_2$ and 80 percent of the stabilized oxide. FIG. 6A shows such a view as seen in cross section with the target substrate being shown substantially in white and the mounting epoxy being shown in black. The coating is shown as an intermediate trace of gray. It will be seen in FIG. 6A that the coating forms a relatively continuous ribbon that remains close to the surface of the substrate. This is an indication of good adherency.

Figure 6B:
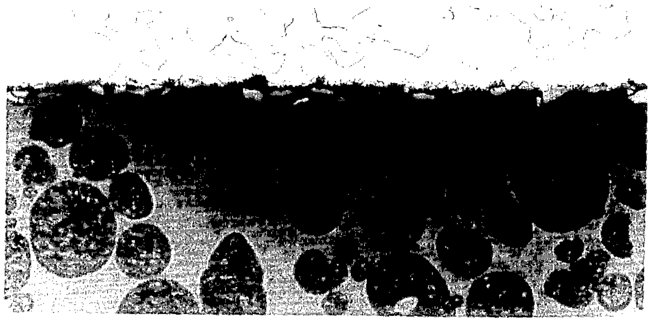
Figure 6C:

When the same coating is applied to a TZM target, the adherency is not nearly as good as will be seen by reference to FIG. 6B. Here the coating appears as discrete sections which are separated from themselves and from the target substrate. FIG. 6C shows the Sample 4 coating (i.e., TZM coated with 50 percent $TiO_2$ and 50 percent stabilized oxide). Here the coating looks much like that of FIG. 6A wherein it is relatively continuous and adheres closely to the target substrate surface.

While the present invention has been disclosed with particular reference to the preferred embodiment, the concepts of this invention are readily adaptable to other embodiments, and those skilled in the art may vary the form or method thereof without departing from the essential spirit of the present invention.

What is claimed as new and desired to be secured by Letters Patent of the United States is:

1. A thermal-emissive coating material on an anode target of an x-ray tube of the type having a cathode for directing the flow of electrons to a focal track portion of the anode target to produce x-rays said coating material comprising a fused application of a mixture comprising from 40 percent to 70 percent by weight of $TiO_2$ with the remaining portion of the mixture being a stabilized oxide primarily selected from the group consisting of $ZrO_2$, HfO, MgO, $CeO_2$, $La_2O_2$, and SrO, and also containing stabilizing material.

2. A thermal-emissive coating material set forth in claim 1 wherein said stabilized oxide is $ZrO_2$.

3. A thermal-emittance coating material as set forth in claim 2 wherein said, stabilized oxide comprises $ZrO_2$ in the amount of 86 to 96 percent by weight and said stabilizing material comprises CaO in the amount of 4 percent to 14 percent by weight.

4. A coating applied to a surface of an x-ray tube target for enhancing the thermal-emittance characteristics thereof comprising an applied mixture of $TiO_2$ in an amount of 40 percent to 70 percent by weight and a stabilized oxide in an amount of 30 to 60 percent by weight, said oxide being primarily selected from the group consisting of $ZrO_2$, HfO, MgO, $CeO_2$, $La_2O_3$, and SrO, and also containing stabilizing material.

5. A coating as set forth in claim 4 wherein $ZrO_2$ is used as the oxide material.

6. A coating as set forth in claim 5 wherein said stabilized oxide comprises 86 to 96 percent by weight of $ZrO_2$ and said stabilizing material comprises 4 to 14 percent by weight of CaO.

7. A thermal-emissive coating material on an anode target of an x-ray tube of the type having a cathode for directing the flow of electrons to a focal track portion of the anode target to produce x-rays, said coating comprising the product resulting from fusing a mixture comprising from 40 percent to 70 percent by weight of $TiO_2$ and from 30 percent to 60 percent by weight of a stabilized oxide being primarily selected from the group consisting of $ZrO_2$, HfO, MgO, $CeO_2$, $La_2O_3$, and SrO, and also containing stabilizing material.

8. The thermal-emissive coating material as set forth in claim 7 wherein said stabilized oxide comprises $ZrO_2$ in the amount of 86 to 96 percent by weight and said stabilizing material comprises CaO in the amount of 4 to 14 percent by weight.

9. A method of applying a thermal-emissive coating to an anode target comprising the steps of:

applying to a surface of the target a coating mixture comprising from 40 percent to 70 percent by weight of $TiO_2$ and from 30 to 60 percent by weight of a stabilized oxide, and heating the target in a vacuum of at least $10^{-5}$ Torr to a temperature in the range of 1620° to 1700° C. for sufficient time to cause said coating to fuse to a smooth, glossy surface.

10. A coating applied to a surface of an x-ray tube target for enhancing the thermal-emittance characteristics thereof comprising an applied mixture of $TiO_2$ in an amount of 40 percent to 70 percent by weight and stabilized $ZrO_2$ in an amount of 30 percent to 60 percent by weight which applied mixture has been heated to a fused condition to provide a smooth, glossy surface of the target.

11. A coating as set forth in claim 10 wherein said stabilized $ZrO_2$ comprises $ZrO_2$ in an amount of 86 to 96 percent by weight and a stabilizing material comprising CaO in an amount of 4 to 14 percent by weight.

* * * * *